United States Patent [19]

Dallman

[11] Patent Number: 5,485,718
[45] Date of Patent: Jan. 23, 1996

[54] FLAIL CUTTER AND METHOD OF PROVIDING A FLAIL CUTTER FOR A BRUSH CUTTING MACHINE

[76] Inventor: Jimmie J. Dallman, 3709 99th Dr. S.E., Everett, Wash. 98205

[21] Appl. No.: 341,019

[22] Filed: Nov. 17, 1994

[51] Int. Cl.⁶ ............................................. A01D 34/52
[52] U.S. Cl. ....................... 56/294; 56/504; 144/208 J; 403/316
[58] Field of Search ..................... 56/12.7, 294, 504; 241/101.2, 191, 193, 194; 144/208 J; 403/52, 315, 316

[56] References Cited

U.S. PATENT DOCUMENTS

| | | | |
|---|---|---|---|
| 3,657,869 | 4/1972 | Ayranto | 56/294 |
| 4,572,258 | 2/1986 | Mischel | 56/294 X |
| 5,003,759 | 4/1991 | Brown | 56/504 X |

FOREIGN PATENT DOCUMENTS

| | | | |
|---|---|---|---|
| 1360289 | 3/1964 | France | 144/208 J |

*Primary Examiner*—David J. Bagnell
*Attorney, Agent, or Firm*—Donna J. Thies

[57] ABSTRACT

In the first preferred embodiment a flail cutter for a brush cutting machine comprises generally a shaft having a plurality of holes therethrough and a locking sheath also with a plurality of holes therethrough. The holes in the shaft and the holes in the locking sheath each receive a hanger, each hanger in turn holding a ring. Each ring holds a pair of flail blades. All blades are thus quickly attached to or removed from the shaft. After all blades have been attached to the shaft, the locking sheath is slid in one horizontal direction over the shaft to thereby lock the blades in attached engagement to the shaft. To remove all the blades, the locking sheath is slid in the opposite horizontal direction to release the blades from the shaft. In the second preferred embodiment, the hangers are attached directly to the shaft and the locking sheath is eliminated. Each hanger still holds the ring and the ring holds a pair of flail blades. The flail cutter is powered by a chain drive system. A method of providing a flail cutter for a brush cutting machine is also disclosed.

27 Claims, 4 Drawing Sheets

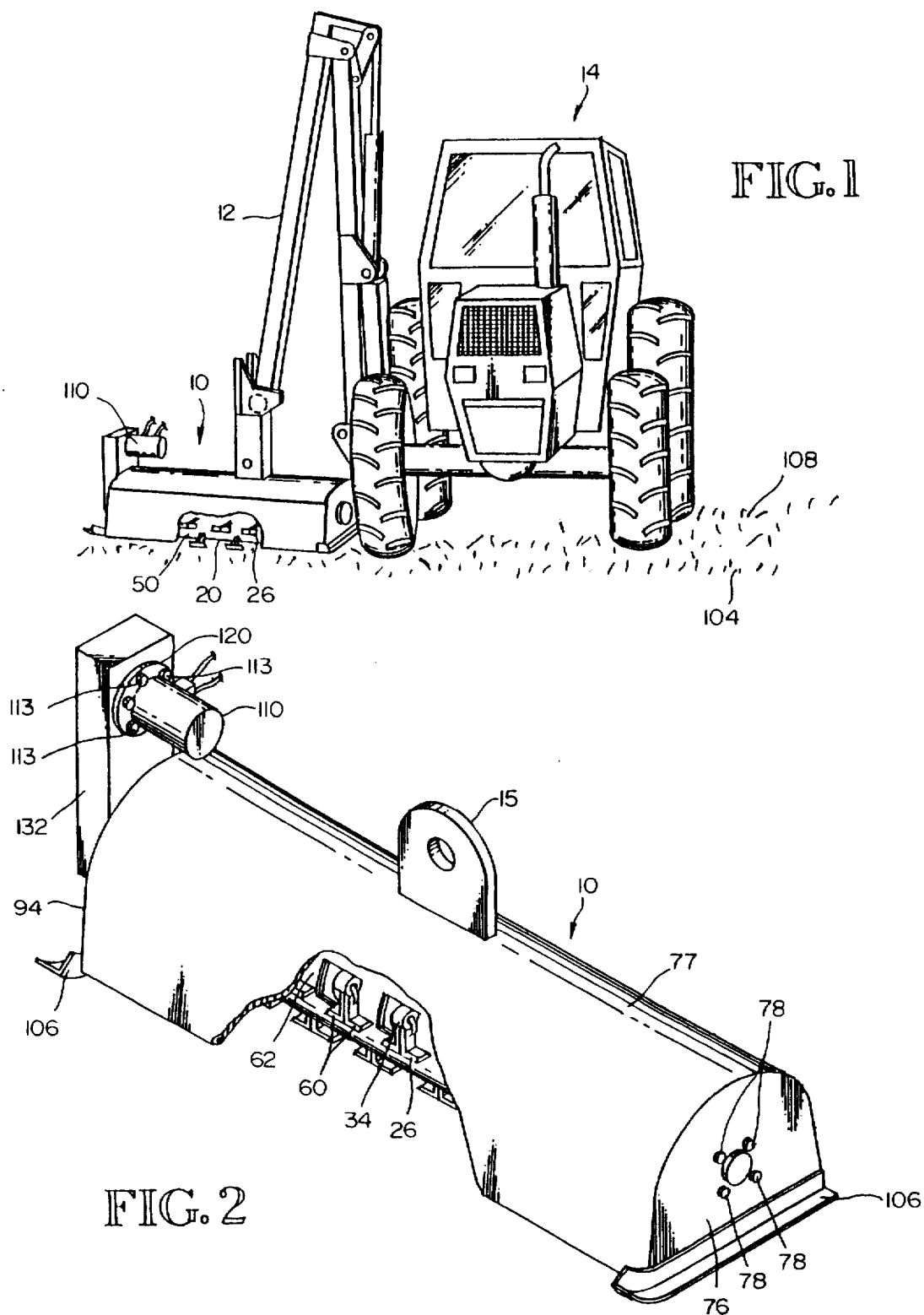

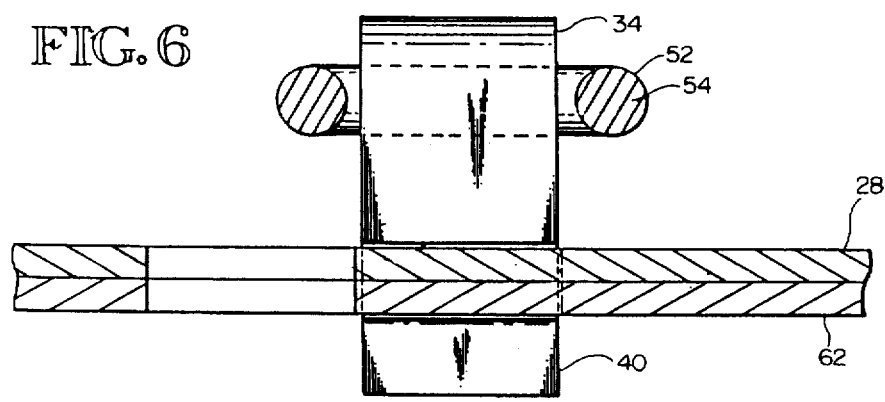
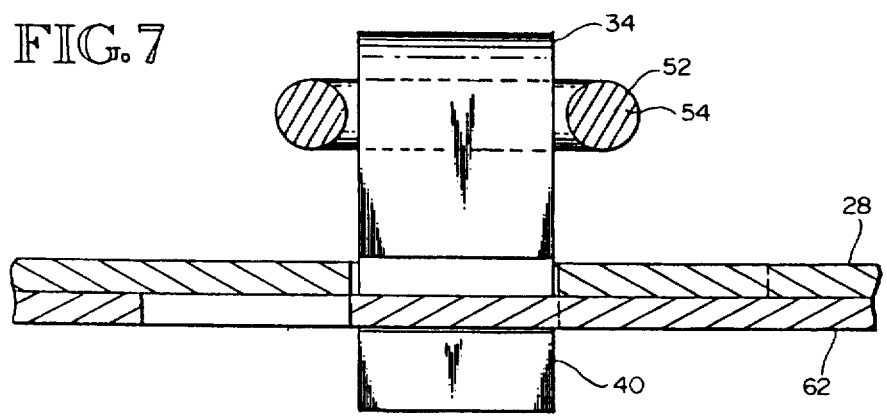
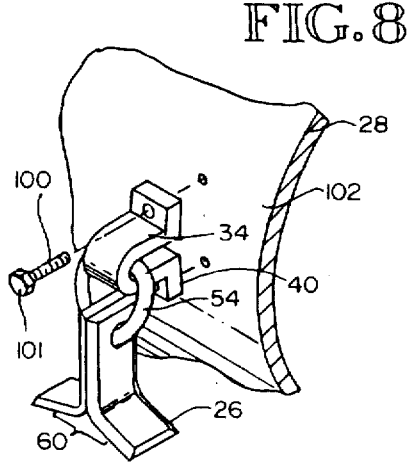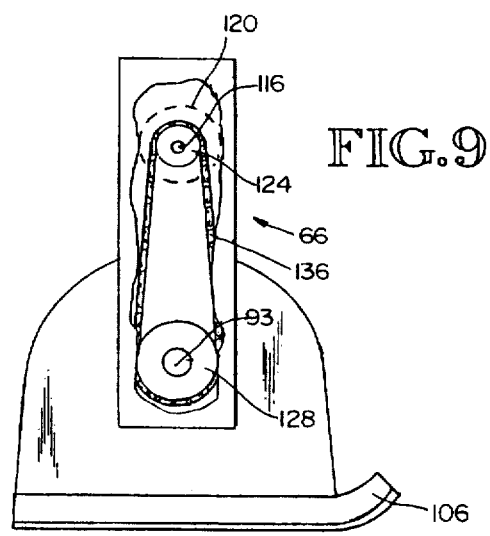

FLAIL CUTTER AND METHOD OF PROVIDING A FLAIL CUTTER FOR A BRUSH CUTTING MACHINE

BACKGROUND OF THE INVENTION

A flail cutter is generally a shaft type cutter having a plurality of hangers welded around the outside perimeter of the shaft. A plurality of small blades are hooked onto the hangers by means of a bolt positioned through a pair of hangers, the bolt holding a ring which in turn holds a pair of blades. As the shaft is rotated and carried over the ground on a roller or skid shoes, the blades slash into the brush to be cut. A problem with the conventional prior art flail cutter is that it takes a very long time to replace these blades on the flail cutter. In the prior art, since each pair of blades is held in place by a pin or bolt, in order to change all the blades, scores of pins or bolts must be removed. This becomes very tedious as while the blades are in use, the nuts for the pins or bolts have become peened to a round shape and the pins or bolts have become bent. A socket wench does not work on these domed nuts so what would have been an arduous task becomes worsened by the time and effort spent trying to remove the damaged nuts and bolts that attach the blades to the shaft. The prior art also typically uses a V-belt drive system to power and rotate the shaft. These V-belts have a tendency to slip and/or break which causes much down time for the brush cutting machine and the operator.

U.S. Pat. No. 2,669,819 to Sawyer discloses a stalk shredder with hammers having independent lateral deflection to reduce breakage of the hammers.

U.S. Pat. No. 2,711,067 to Mott discloses a flail mower with the blades hung on C-rings.

U.S. Pat. No. 3,004,765 to Wilkes discloses beater chains that extend through holes in a cylindrical sleeve. A rod is located in the center of the sleeve.

U.S. Pat. No. 3,161,412 to Ferris discloses a spreader with flails driven by a tube that has notches that are engaged by clutch pins extending from a central shaft.

U.S. Pat. No. 3,167,318 to Ferris teaches flexible flails extending from a shaft and through a tube. The flexible flails are in the form of chains that are wound around the shaft, the chains unwinding during unloading of material.

U.S. Pat. No. 4,587,800 to Jimenez discloses a grass trimming and edging device which allows the motor to be mounted in two positions, one to present the cutting element in a substantially vertical plane and one to present the cutting element in a substantially horizontal plane.

U.S. Pat. No. 5,353,881 to Lee, et.al., discloses a twin shaft system for a lawn mower type device where each shaft rotates in opposite directions.

SUMMARY OF THE INVENTION

In order to overcome problems inherent in the prior art there has been devised by the present invention an improved flail cutter for a brush cutting machine. Unlike the prior art, the flail cutter of the first preferred embodiment of the present invention does not use any pins or bolts to hold the plurality of blades in place on the shaft. The flail cutter of the present invention uses a locking means in the form of an outer cylinder that is positioned over a long steel shaft to lock the blades in place. In the first preferred embodiment of the present invention, hangers are inserted into mating holes cut in the long steel shaft and through a second plurality of mating holes in the outer cylinder. The hangers of the present invention are designed to receive a ring which holds a pair of blades back to back. The hangers are inserted into the holes in the outer cylinder and the shaft. After all the blades are installed on the hangers with the rings, the cylinder is slid across the long shaft, the cylinder having a very close inside and outside diameter tolerance with the shaft. This outer cylinder or sheath serves as the locking means for the blades. The sheath slides back and forth horizontally across the inner shaft. When the sheath is slid in one direction, the blades are locked in place and in the opposite direction the blades are released. So that after all the blades are installed on the hangers with the rings thereby attaching the blades to the shaft, the outer sheath is slid, thus locking all the blades in place. This results in a much quicker attachment of the blades as they become dulled thereby greatly decreasing maintenance time and expense. The plurality of blades can thus be changed in minimal time on the flail cutter of the present invention. In the second preferred embodiment of the present invention, the hangers are bolted or otherwise suitably attached directly onto the shaft. The rings are inserted into the hangers in a manner similar to the first preferred embodiment, the rings holding a pair of blades back to back. When it is desired to change the blades in the second preferred embodiment, the bolts that attach the hangers to the shaft are unbolted, the pair of blades are removed and new blades are replaced on the ring. The ring with the new blades is inserted into the hanger and the hanger is rebolted to the shaft. In the second preferred embodiment of the present invention, the use of the outer sheath is eliminated as the hangers are attached directly to the outer perimeter of the shaft. This is an improvement over the prior art in that, by attaching the hangers directly onto the shaft with bolts that are perpendicular to the outer perimeter of the shaft and not facing parallel to the outer perimeter of the shaft, the bolt heads and nuts are not exposed to flying stones or debris that would peen and damage the nuts and bolts. Thus, the hangers and hence the blades are much easier to remove and re-attach.

The flail cutter of the present invention also uses a chain drive system instead of a V-belt drive system employed by the prior art. Unlike the prior art, the chain drive system used with the present flail cutter does not use belts that can slip and/or break thereby increasing maintenance time and expense. The hydraulic motor used to power the flail cutter of the present invention is mounted on the housing of the chain drive system. This housing and hence the hydraulic motor is removable from the flail cutter so as to provide easy maintenance on the motor, sprockets and chain. It can also be removed and mounted on other flail cutters as an emergency replacement part. The housing of the chain drive system of the flail cutter is designed to provide an oil bath for the chain and sprocket to run in. This is accomplished by seals around both the motor shaft and the axle of the flail cutter and a gasket between the chain drive cover and the housing.

It is therefore an object and advantage of the present invention to provide a flail cutter with a quick and easy blade replacement for low maintenance time and expense.

It is another object and advantage of the present invention to provide a flail cutter powered by a chain drive system to improve the dependability of the cutter by eliminating belts that can slip and/or break.

It is another object and advantage of the present invention to provide a flail cutter with securely attached blades and attaching means so that the blades do not fly off the flail cutter upon hitting a hard object.

It is still yet another object and advantage of the present invention to provide a flail cutter with a portable hydraulic motor for easy maintenance on the motor, sprockets and chain.

It is still yet another object and advantage of the present invention to provide a flail cutter with a portable motor to be used as an emergency replacement part for another flail cutter.

These and other objects and advantages of the present invention will become apparent with a review of the following drawings and from a study of the specification portion hereinafter describing the preferred embodiments of the invention.

BRIEF DESCRIPTION OF THE DRAWINGS

FIG. 1 is a front perspective view showing how the flail cutter of a first preferred embodiment of the present invention is attached to an existing brush cutting machine.

FIG. 2 is a front perspective view of the first preferred embodiment of the flail cutter of the present invention having a cut out portion showing how the blades are attached to the flail cutter in the present invention.

FIG. 6 is a cross-sectional view taken through line 6—6 of FIG. 4 showing how the blades are attached to the shaft of the flail cutter of the first preferred embodiment of the present invention before the blades have been locked into place by the locking sheath of the present invention.

FIG. 7 is a cross-sectional view taken through line 7—7 of FIG. 5 showing how the blades have been attached to the shaft of the flail cutter of the first preferred embodiment of the present invention after the blades have been locked into place by the locking sheath of the present invention.

FIG. 8 is an enlarged isometric view similar to FIG. 5 of the flail cutter of the second preferred embodiment of the present invention showing how the blades have been easily attached to the shaft of the flail cutter with the hangers bolted or otherwise suitably attached to the shaft of the flail cutter.

FIG. 9 is an enlarged exploded isometric view showing in greater detail the chain drive system that powers and rotates the shaft of the flail cutter of the present invention.

DESCRIPTION OF THE PREFERRED EMBODIMENT

Figure 3:
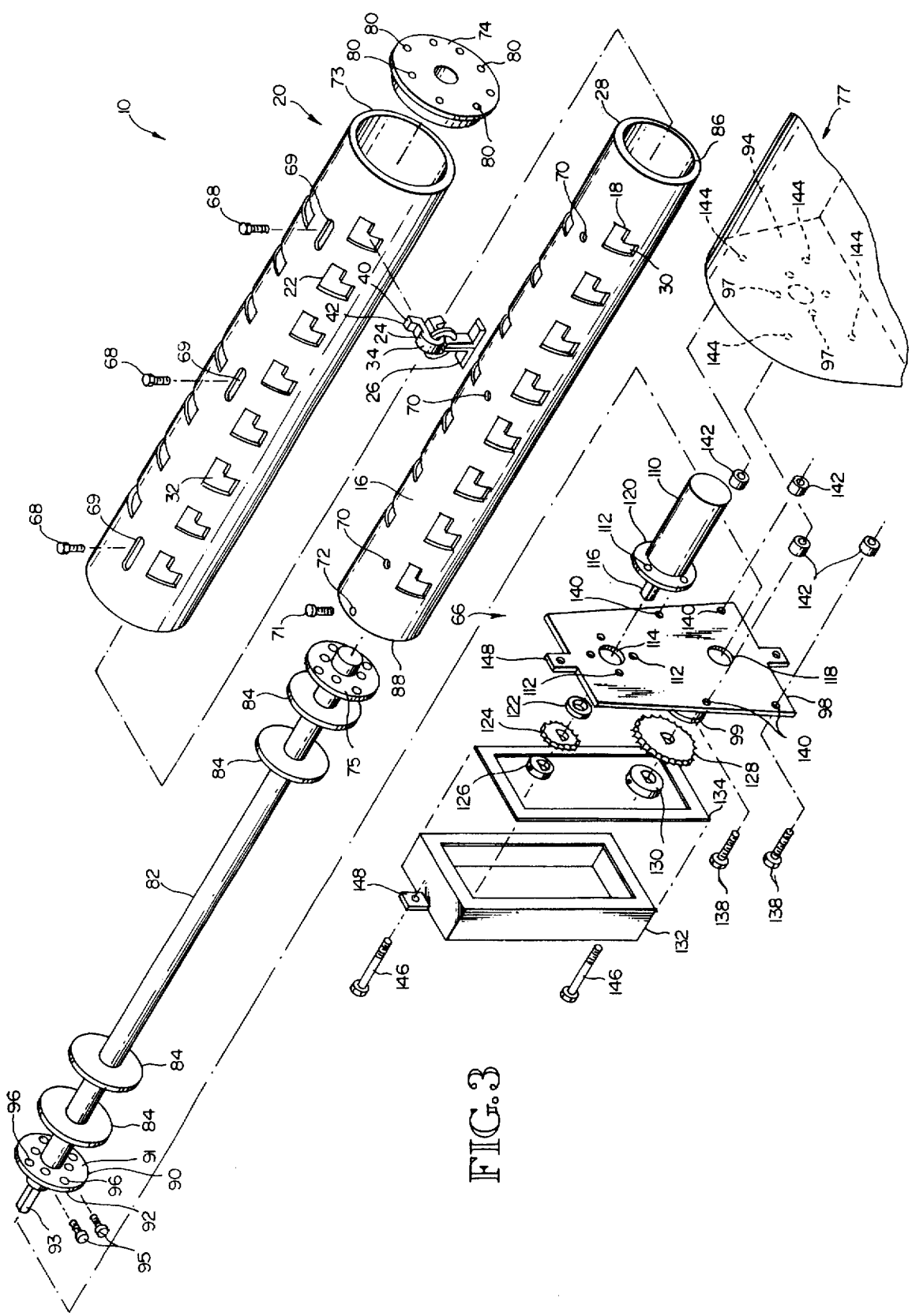
FIG. 3 is an exploded isometric view of the first preferred embodiment of the flail cutter of the present invention showing also how the blades are attached to the flail cutter of the present invention.

Referring now to the drawings in general and in particular to FIG. 1 of the drawings there is shown a front perspective view of how the flail cutter of the first preferred embodiment of the present invention is attached to a conventional brush cutting machine. The flail cutter of the present invention is shown generally by the number 10. The flail cutter 10 is attached to the boom 12 of a tractor 14 by the attaching plate 15 positioned on the flail cutter 10 as seen in FIG. 2.

Figure 4:
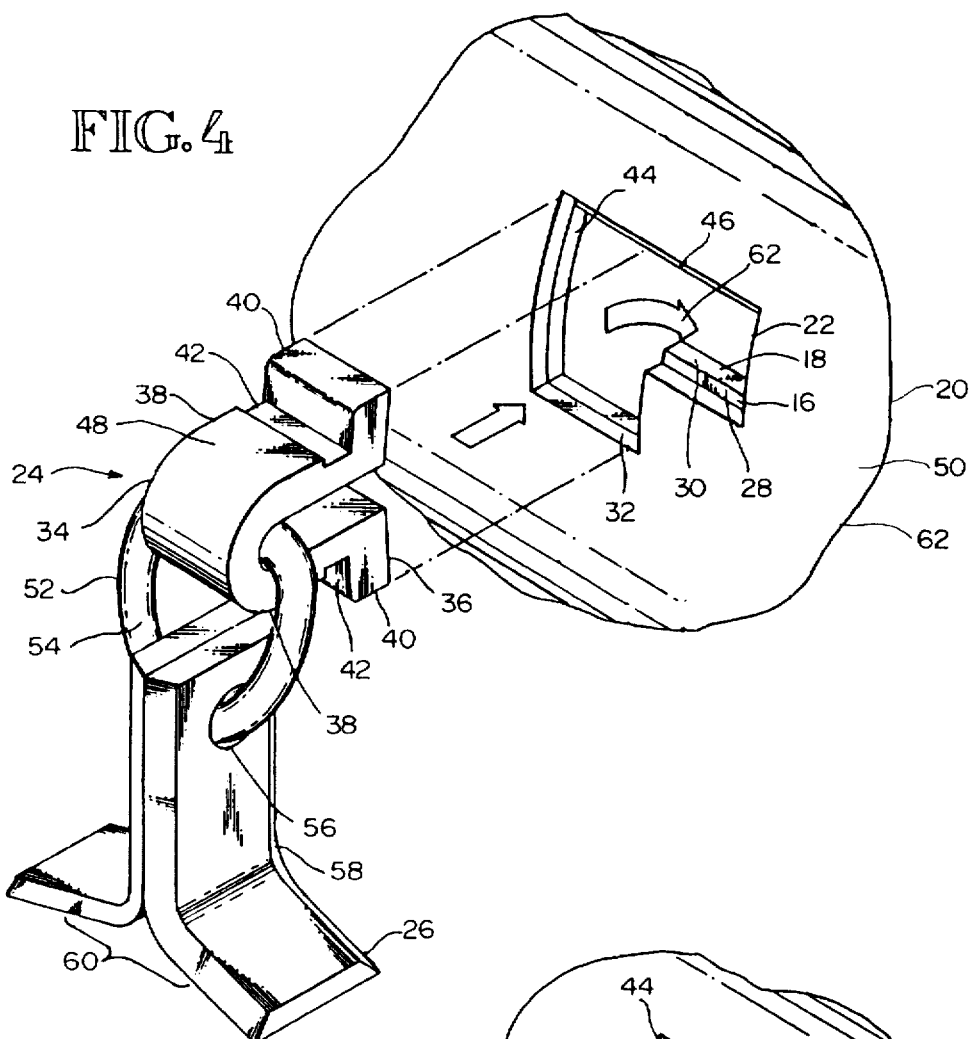
FIG. 4 is an enlarged exploded isometric view of the first preferred embodiment of the flail cutter of the present invention showing how the blades are easily attached to the shaft of the flail cutter and showing the blades before they are locked into place by the locking sheath of the present invention.

As seen most clearly in FIGS. 3 and 4, the flail cutter 10 generally comprises a generally cylindrical member 16, the generally cylindrical member 16 having a plurality of first receiving means 18 positioned thereon. A locking means 20 having a plurality of second receiving means 22 positioned thereon is positioned over the generally cylindrical member 16 whereby the plurality of first receiving means 18 line up with the plurality of second receiving means 22 as seen most clearly in FIG. 4. Each of the first receiving means 18 and the second receiving means 22 has one of a plurality of attaching means 24 attached thereto. At least one of a plurality of blades 26 is attached to one of the attaching means 24. The second plurality of receiving means 22 on the locking means 20 is positioned over the first plurality of receiving means 18 on the cylinder 16 to thereby lock the blades 26 in attached engagement to the generally cylindrical member 16.

Figure 5:
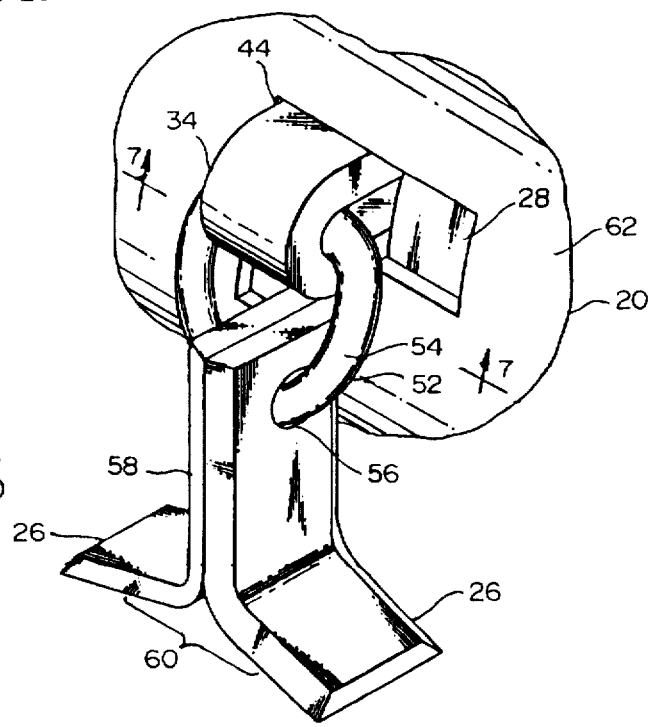
FIG. 5 is an enlarged exploded isometric view of the first preferred embodiment of the flail cutter of the present invention showing how the blades have been easily attached to the shaft of the flail cutter and showing the blades after they have been locked into place by the locking sheath of the present invention.

In the preferred embodiment of the present invention, the generally cylindrical member 16 is in the form of a shaft 28. As seen most clearly in FIG. 3, the plurality of first receiving means 18 are in the form of generally L-shaped holes 30 positioned through the shaft 28. The plurality of second receiving means 22 on the locking means 20 are lined up with the plurality of first receiving means 18 and are also generally L-shaped holes 32. The plurality of attaching means 24 are in the form of generally U-shaped hangers 34. On each of the U-shaped hangers 34, at the top 36 of both sides 38 of the U-shape there are protrusions 40 as seen most clearly in FIG. 4. Directly under the two protrusions 40 are two notches 42. Each of these two protrusions 40 is adapted to fit in locking engagement with the two sides 44 of the top 46 of the upside-down L-shaped hole 30 in the shaft 28 as seen in FIGS. 3 and 4. The shaft 28 slides into the notches 42 on the hangers 34 and the locking means 20 slides over the thicker part 48 on both sides 38 of the U-shaped hanger 34. In this way, each of the plurality of hangers 34 is inserted through a mating L-shaped hole 32 through the outside perimeter 50 of the locking means 20 and through another mating L-shaped hole 30 in the shaft 28 also as seen in FIGS. 3 and 4. In operation, when it is desired to change any or all of the flail blades 26 in a quick and simple fashion, the hangers 34 are slid out of their locked engagement in the mating L-shapes holes 30 and 32. As best seen in FIG. 4, a holding means 52 in the form of a C-shaped ring 54 which is known in the art, is positioned through an attaching hole 56 in the stem 58 of the blade 26 whereby a pair of blades 60 are positioned back to back on the C-shaped ring 54. The U-shaped hanger 34 is then positioned onto the combination of the C ring 54 and the pair of blades 60, the C-shaped ring 54 serving to hold the blades 26 on the U-shaped hanger 34. The U-shaped hanger 34 with the C ring 54 and the blades 26 attached, is then slid back into engagement with the protrusions 40 on the U-shaped hanger 34 fitting snugly into the two sides 44 of the top 46 of the upside down L-shaped hole 30 in the shaft 28 as described earlier. The purpose of the C-shaped ring 54 is to allow the pair of blades 60 to flail freely from the hanger 34 and to position the pair of blades 60 perpendicular to the hanger 34 so that the blades 26 are facing forwardly in the proper cutting position. When each of the hangers 34 has been inserted into each of the holes 30 in the shaft 28 and each of the holes 32 in the locking means 20, with the locking means 20 positioned over the shaft 28; the pairs of blades 60 on the C ring 54 inserted through the hangers 34 has thereby attached the blades 26 to the shaft 28. In the preferred embodiment of the present invention, the locking means 20 is in the form of a slidable sheath 62. The slidable sheath 62 is designed to have a very close inside and outside diameter tolerance with the shaft 28 and further to slide back and forth horizontally across the shaft 28. When the sheath 62 is slid in either horizontal direction across the shaft 28, the blades 26 as they are attached to the shaft 28 as described earlier, are all locked in place. As the sheath 62 is slid in the opposite horizontal direction across the shaft 28, the blades 26 are released. For purposes of illustration, in FIG. 4, there is shown an enlarged exploded isometric view with motion arrows 64 showing the motion of the sheath 62 across the shaft 28 and showing how the blades 26 have been inserted into the C rings 54, hangers 34, holes 32 on the outside perimeter 50 of the sheath 62 and holes 30 in the shaft 28 before the blades 26 have been locked in place by the locking sheath 62. If the locking sheath 62 then is slid across the shaft 28 in the direction of the motion arrows 64 as shown in FIG. 4 then the blades 26 will be locked in place as shown in the enlarged exploded isometric view of FIG. 5. It is to be understood that FIGS. 4 and 5 are illustrative only and if the sheath 62 were to be slid across the shaft 28 in the horizontal direction opposite the motion arrows 64 in FIG. 4 to unlock the blades 26, then the sheath 62 could be slid in the direction of the motion arrows 64 to lock the blades 26 into position. In other words, the directions the sheath 62 is slid in to lock and unlock the blades 26 are interchangeable.

Referring now to FIG. 3 of the drawings there is shown an exploded isometric view of the first preferred embodiment of the flail cutter 10 of the present invention showing how the blades 26 are attached to the flail cutter 10 of the present invention and showing the chain drive system 66 that powers the shaft 28 of the present invention as will be described in greater detail later. FIG. 3 shows the locking sheath 62 as it is positioned over the rotatable shaft 28 of the present invention. The locking sheath 62 is attached to the shaft 28 by means of the bolts 68 but can be attached by any suitable means. The bolts 68 are inserted through the slots 69 in the locking sheath 62 and through the holes 70 in the shaft 28. After the locking sheath 62 has been slid into the locked position as described previously, the locking bolt 71 is inserted into the hole 72 and secures the locking sheath 62 in place.

Positioned near one end 73 of the locking sheath 62 is a false end 74. This false end 74 secures a first hub 75 to the end 76 of the cover or shroud 77 of the flail cutter 10 as seen in FIG. 2. When removed, this false end 74 allows the shaft 28 and the locking sheath 62 to be removed out through the end 76 of the flail cutter shroud 77. The first hub 75 has within a plurality of bearings (not shown), as known in the art and as may be used in a standard trailer axle housing. Four bolts 78 are positioned through four mating holes 80 in the false end 74 to attach the false end 74 to the shroud 77 of the flail cutter 10 as seen in FIG. 2. The first hub 75 is attached to the cutter axle 82 and to the false end 74. Within the shaft 28 is the axle 82, the axle 82 having four plugs 84 positioned thereon. The plugs 84 are welded to the inside of the shaft 28, the plugs 84 having the same diameter as the inside diameter 86 of the shaft 28 to hold everything tightly in place inside the shaft 28. At the end 88 of the combination shaft and locking sheath 62 opposite to the end 73 of the combination shaft 28 and locking sheath 62 near the first hub 75 there is a second hub 90, the second hub 90 being attached on one side 91 to the axle 82 and on the second side 92 to the cutter shaft 93, the cutter shaft 93 serving to rotate the shaft 28 by means of the chain drive system 66. The second hub 90 also has a plurality of bearings within (not shown) similar to the first hub 75. The second hub 90 is attached to the end 94 of the shroud 77 opposite to the end 76 of the shroud 77 that carries the false end 74. The second hub 90 is attached to the end 94 of the shroud 77 by four bolts 95 positioned through four holes 96 in the second hub 90 and four tapped mating holes 97 in the end 94 of the shroud 77. The cutter shaft 93 is positioned through the chain drive housing 98 and seal 99 of the chain drive system 66 as shown by the dashed line in FIG. 3, the chain drive system 66 to be described in greater detail hereinafter.

FIG. 8 is an enlarged isometric partial view of the flail cutter of the second preferred embodiment of the present invention showing how the blades 26 have been easily attached to the shaft 28 of the flail cutter with the hangers 34 bolted or otherwise suitably attached to the shaft 28. In the second preferred embodiment of the present invention as shown in FIG. 8, it can be seen that the locking means 20 in the form of a slidable sheath 62 as shown in FIG. 3 has been removed and the U-shaped hangers 34 have been attached by bolts 100 or other suitable means directly to the outside perimeter 102 of the shaft 28. The same C-ring 54 as shown in the first preferred embodiment of the present invention has been inserted through the U-shaped hanger 34 and the C ring 54 holds the pair of flail blades 60 positioned back to back. To change the blades 26 in the second preferred embodiment as shown in FIG. 8, the U-shaped hangers 34 are unbolted, the C-ring 54 and blades 26 are removed from the hanger 34, the blades 26 are replaced with new ones and returned to the C-ring 54, the C-ring 54 is slipped back into engagement with the U-shaped hanger 34, and the U-shaped hanger 34 is rebolted to the shaft 28. This is an improvement over the prior art since in the present invention the hangers 34 are attached directly onto the shaft 28 such that the bolts 100 are positioned perpendicularly into the shaft 28 so they are against the shaft 28 instead of sticking out away from and parallel to the shaft 28 as in the prior art, thus keeping the bolt heads 101 from being exposed to stones or other flying debris. The bolts 100 and bolt heads 101 therefore do not become peened or damaged and are much easier to remove. It is within the spirit and scope of the present invention to attach the hangers 34 to the outside perimeter 102 of the shaft 28 in any suitable manner other than by the bolts 100 shown in FIG. 8.

In operation, the flail cutter 10 of the present invention is powered and caused to rotate near the ground 104 as seen in FIG. 1 by means of a chain drive system shown generally by the number 66 as shown in FIG. 3 and FIG. 9. As the shaft 28 is rotated and carried over the ground 104 on skid shoes 106 or a roller (not shown), the rotation of the shaft 28 of the flail cutter 10 causes the blades 26 to slash into the brush 108 to be cut as seen also in FIG. 1. The prior art generally uses a V-belt system to rotate the flail cutter. As these belts turn, they are caused to slip and/or break; in both instances resulting in down time for the machine and operator and resultant excess maintenance time and expense. To the contrary, the flail cutter 10 of the present invention is powered by the chain drive system 66 as shown most clearly in FIG. 3 and in FIG. 9. In the chain drive system 66 of the present invention the hydraulic motor 110 for the flail cutter 10 is removably mounted or bolted on the chain drive housing 98, the chain drive housing 98 having a first hole 114 for receiving the motor shaft 116 and a second hole 118 for receiving the cutter shaft 93. Attached to and integral with the hydraulic motor 110 is a pad or flange 120 for the motor 110. The motor shaft 116 is positioned through the housing 98, a seal 122, a sprocket 124 and a locking ring 126 for locking the sprocket 124 on the motor shaft 116. Mating holes 112 on the chain drive housing 98 match up to mating holes 112 on the flange 120 wherein the hydraulic motor 110 is bolted to the chain drive housing 98 through the mating holes 112. The bolts 113 positioned through the flange 120 and the chain drive housing 98 are seen in FIG. 2. As described previously with reference to FIG. 3, the cutter shaft 93 is positioned as shown by the dashed lines in FIG. 3 through the hole 118 in the chain drive housing 98, a seal 99, a sprocket 128 and a locking ring 130 for locking the sprocket 128 onto the cutter shaft 93. Positioned between the chain drive housing 98 and a cover 132 for the chain drive system 66 is a gasket 134. The chain drive system 66 is removable from the flail cutter 10 so as to provide easy maintenance on the motor 110, sprockets 124 and 128 and chain 136 as seen also in FIGS. 3 and 9. The chain drive system 66 for the flail cutter 10 is removably mounted to the end 94 of the shroud 77 opposite the first end 76 of the shroud 77 of the flail cutter 10 by means of four bolts 138 positioned through four holes 140 in the chain drive housing 98, four spacers 142 and four tapped mating holes 144 in the end 94 of the shroud 77. It can also be removed and mounted on other flail cutter as an emergency replacement part. The chain drive housing 98 is also designed to provide an oil bath for the chain 136 as seen in FIG. 9 and sprockets 124 and 128 to run in. This is accomplished by providing the seals 99 and 122 around both the motor shaft 116 and the cutter shaft 93; and the gasket 134 that is positioned between the cover 132 of the chain drive system 66 and the chain drive housing 98. Bolts 146 are inserted through tapped winged tabs 148 to hold the cover 132 in place on the chain drive system 66. In operation, as the tractor 14 is started and the flail cutter 10 is lowered close to the ground 104 by the boom 12 of the tractor 14 as seen in FIG. 1 the chain drive system 66 transfers the power provided by the hydraulic motor 110 of the flail cutter 10 to the cutter shaft 93. Spinning the cutter shaft 93 at high revolutions per minute gives a flailing motion to the blades 26.

From the foregoing it can be seen that the applicant's invention provides an improved flail cutter for a brush cutting machine that uses a removable attaching arrangement for attaching the numerous flail blades to the rotating shaft that turns to present the blades to the brush to be cut. A locking means also insures that all the blades are held tightly in place after they have been attached to the shaft. In this way, what had been a tedious and time consuming job in the prior art has been eliminated. The flail cutter for a brush cutting machine of the present invention also powers and rotates the shaft by means of a chain drive system to provide a less maintenance intensive power system for the flail cutter. There has been accomplished by the applicant's invention all of the objects and advantages of the invention. Nevertheless, variation in the structure of the invention and the arrangement of the various parts are within the spirit and scope of the applicant's invention. The embodiments given have been given only by way of illustration and the applicant is not to be limited to the embodiments shown and described.

Having described my invention I claim:

1. A flail cutter for a brush cutting machine, the flail cutter having blades and comprising:
   a) a rotatable generally cylindrical member;
   b) a plurality of one piece attaching means, each of the one piece attaching means directly attached to the generally cylindrical member; and
   c) a plurality of holding means removably attached to the attaching means, each holding means holding at least one blade of the flail cutter.

2. The flail cutter for a brush cutting machine as defined in claim 1 wherein the plurality of attaching means are U-shaped hangers.

3. The flail cutter for a brush cutting machine as defined in claim 2 wherein the plurality of holding means are C-shaped rings.

4. A flail cutter for a brush cutting machine, the flail cutter having blades and comprising:
   a) a rotatable generally cylindrical member having a plurality of first receiving means positioned thereon;
   b) a locking means having a plurality of second receiving means positioned thereon, the plurality of second receiving means positioned over the plurality of first receiving means;
   c) a plurality of attaching means, each attaching means attached to one of the first and second receiving means; and
   d) a plurality of holding means, each holding means removably attached to one of the attaching means, each holding means holding at least one blade, each holding means thereby attaching at least one blade to each of the attaching means.

5. The flail cutter for a brush cutting machine as defined in claim 4 wherein the plurality of first receiving means are holes positioned through the generally cylindrical member.

6. The flail cutter for a brush cutting machine as defined in claim 5 wherein the holes of the plurality of first receiving means are generally L-shaped; and whereby the L-shaped holes of the plurality of first receiving means receive the attaching means in removable engagement.

7. The flail cutter for a brush cutting machine as defined in claim 4 wherein the plurality of second receiving means are holes positioned through the locking means.

8. The flail cutter for a brush cutting machine as defined in claim 7 wherein the holes of the plurality of second receiving means are generally L-shaped; and whereby the L-shaped holes of the plurality of second receiving means receive the attaching means in removable engagement.

9. The flail cutter for a brush cutting machine as defined in claim 4 wherein the attaching means are removably attached to the first and second receiving means.

10. The flail cutter for a brush cutting machine as defined in claim 9 wherein the attaching means are hangers, each hanger having a first and second ends, the hangers each removably attached to one of the first and second receiving means at the first end, the hangers each attached to one of the holding means at the second end thereby holding a blade at the second end.

11. The flail cutter for a brush cutting machine as defined in claim 10 wherein the hangers are removably inserted into the first and second receiving means and wherein the holding means is in the form of a C ring.

12. The flail cutter for a brush cutting machine as defined in claim 9 wherein the attaching means are hangers, the hangers each having a first and second ends, the hangers each removably inserted into one of the first and second receiving means at the first end, the hangers each attached to one of the holding means at the second end thereby holding a blade at the second end.

13. The flail cutter for a brush cutting machine as defined in claim 4 wherein the locking means is a slidable sheath to slide over the generally cylindrical member to thereby lock the blades in place attached to the generally cylindrical member.

14. The flail cutter for a brush cutting machine as defined in claim 4 wherein the generally cylindrical member is powered by means of a chain drive system.

15. The flail cutter for a brush cutting machine as defined in claim 14 wherein the chain drive system is portable and removable from the flail cutter.

16. A method for providing a flail cutter for a brush cutting machine, the flail cutter having blades, comprising the steps of:
   a) providing a rotatable generally cylindrical member having a plurality of first receiving means positioned thereon;
   b) providing a locking means having a plurality of second receiving means positioned thereon, the plurality of second receiving means positioned over the plurality of first receiving means;
   c) providing a plurality of attaching means;
   d) attaching each attaching means to one of the first and second receiving means;
   e) providing a holding means, and;
   f) removably attaching each of the attaching means to one of the holding means, each holding means holding at least one blade, each holding means thereby attaching at least one blade to each of the attaching means.

17. The method of providing a flail cutter for a brush cutting machine as defined in claim 16 wherein the plurality of first receiving means are holes positioned through the generally cylindrical member.

18. The method of providing a flail cutter for a brush cutting machine as defined in claim 17 wherein the holes of the plurality of first receiving means are generally L-shaped; and whereby the L-shaped holes of the plurality of first receiving means receive the attaching means in removable engagement.

19. The flail cutter for a brush cutting machine as defined in claim 16 wherein the plurality of second receiving means are holes positioned through the locking means.

20. The method of providing a flail cutter for a brush cutting machine as defined in claim 19 wherein the holes of the plurality of second receiving means are generally L-shaped; and whereby the L-shaped holes of the plurality of second receiving means receive the attaching means in removable engagement.

21. The method of providing a flail cutter for a brush cutting machine as defined in claim 16 wherein the attaching means are removably attached to the first and second receiving means.

22. The method of providing a flail cutter for a brush cutting machine as defined in claim 21 wherein the attaching means are hangers, the hangers each having a first and second ends, the hangers each removably attached to one of the first and second receiving means at the first end, the hangers each attached to one of the holding means at the second end thereby holding a blade at the second end.

23. The method of providing a flail cutter for a brush cutting machine as defined in claim 22 wherein the hangers are removably inserted into the first and second receiving means and wherein the holding means is in the form of a C clip.

24. The method of providing a flail cutter for a brush cutting machine as defined in claim 21 wherein the attaching means are hangers, the hangers each having a first and second ends, the hangers each removably inserted into one of the first and second receiving means at the first end, the hangers each attached to one of the holding means at the second end thereby holding a blade at the second end.

25. The method of providing a flail cutter for a brush cutting machine as defined in claim 16 wherein the locking means is a slidable sheath to slide over the generally cylindrical member to thereby lock the blades in place attached to the generally cylindrical member.

26. The method of providing a flail cutter for a brush cutting machine as defined in claim 16 wherein the generally cylindrical member is powered by means of a chain drive system.

27. The method of providing a flail cutter for a brush cutting machine as defined in claim 26 wherein the chain drive system is portable and removable from the flail cutter.

* * * * *